United States Patent [19]

Bentham et al.

[11] Patent Number: 4,818,346

[45] Date of Patent: Apr. 4, 1989

[54] VERTICAL DISTILLATION COLUMN WITH A DE-ENTRAINMENT DEVICE

[75] Inventors: Jeremy B. Bentham; Johan J. B. Pek, both of The Hague, Netherlands

[73] Assignee: Shell Oil Company, Houston, Tex.

[21] Appl. No.: 47,377

[22] Filed: May 7, 1987

[30] Foreign Application Priority Data

May 7, 1986 [GB] United Kingdom ............... 8611122

[51] Int. Cl.⁴ ............................................. B01D 3/10
[52] U.S. Cl. ................................. 202/197; 202/185.2; 55/185; 55/440; 122/489; 203/40
[58] Field of Search ............ 202/197, 185.2, 187, 202/159, 178, 205; 203/40; 55/185, 440; 196/155, 125, 114, 136; 122/489, 492

[56] References Cited

U.S. PATENT DOCUMENTS

| | | | |
|---|---|---|---|
| 1,896,656 | 2/1933 | Anderson | 55/440 |
| 1,928,706 | 10/1933 | Sillers | 55/440 |
| 2,143,191 | 1/1939 | Fletcher et al. | 55/440 |
| 2,956,934 | 10/1960 | Waddill | 203/88 |
| 3,289,398 | 12/1966 | McIlvaine | 55/440 |
| 3,434,935 | 3/1969 | Habendorff et al. | 202/187 |
| 3,616,623 | 11/1971 | Reid | 55/440 |
| 4,140,212 | 2/1979 | O'Blasny et al. | 196/114 |
| 4,264,411 | 4/1981 | Almond | 55/440 |
| 4,278,495 | 7/1981 | Regehr | 159/27 A |
| 4,565,554 | 1/1986 | Zipay et al. | 55/185 |

FOREIGN PATENT DOCUMENTS

| | | | |
|---|---|---|---|
| 2725119 | 6/1977 | Fed. Rep. of Germany . | |
| 404490 | 3/1974 | U.S.S.R. | 55/440 |
| 2084884 | 4/1982 | United Kingdom . | |

Primary Examiner—Wilbur Bascomb

[57] ABSTRACT

A vertical distillation column for vacuum distillation having a feed inlet, a gas outlet and a de-entrainment device which comprises a downstream chamber and an upstream chamber separated from each other by an inclined permeable wall comprising coalescence means and flow controlling means restricting fluid flow through the upper part of the coalescence means.

13 Claims, 3 Drawing Sheets

VERTICAL DISTILLATION COLUMN WITH A DE-ENTRAINMENT DEVICE

BACKGROUND OF THE INVENTION

The present invention relates to a vertical distillation column for distilling or fractionating a feed under vacuum having a feed inlet arranged in the lower part of the column, and a de-entrainment device arranged in the column between the feed inlet and the gas outlet.

During normal operation the gas outlet is connected with a vacuum device, for example a stream ejector, to maintain the pressure in the top of the vertical distillation column between 100 Pa (absolute) and 10,000 Pa (absolute), and feed comprising gas and liquid is introduced into the column via the feed inlet. Since the gas will not totally entrain the liquid, a part of the liquid drops into the lower part of the column and is discharged therefrom through a liquid outlet arranged in the lower part of the column. A mixture of gas and remaining liquid is passed upwards. To remove part of the liquid from the mixture, the known vertical column is provided with a de-entrainment device in the form of a horizontal layer of structured or random packing.

Liquid collected on the packing pertaining to the de-entrainment is collected, which liquid flows downwards and drops from the de-entrainment device into the lower part of the column from where it is discharged through the liquid outlet. Gas having a reduced content of liquid is passed from the de-entrainment device to the upper part of the column where it can be treated, for example a condensable component can be separated from the gas in a condensing section.

In the specification, the term gas also refers to vapours or to mixtures of gases and vapours.

As the amount of feed introduced into the vertical distillation column per unit of time is increased, the velocity of the gas flowing through the de-entrainment device is increased as well. A further increase in the amount of feed introduced per unit of time may result in a gas velocity which is so high that liquid collected on the de-entrainment device will be re-entrained, which deteriorates the performance of the de-entrainment device.

The area of the de-entrainment device perpendicular to the direction of the gas flow could be increased to reduce the velocity of the gas flowing through the de-entrainment device, but this area is limited by the diameter of the vertical distillation column.

An important parameter for the performance of the vacuum distillation column is the resistance against flow of gas through the de-entrainment device. This resistance is usually referred to as pressure drop across the de-entrainment device.

SUMMARY OF THE INVENTION

It is an object of the present invention to provide a vertical distillation column comprising a de-entrainment device of which the area perpendicular to the direction of gas flow can be increased and wherein the gas is evenly distributed over the area of the de-entrainment device, without significantly increasing the pressure drop across the de-entrainment device.

To this end, a vertical distillation column according to the present invention has a feed inlet arranged in the lower part of the column, a gas outlet arranged in the upper part of the column, and a de-entrainment device arranged in the column between the feed inlet and the gas outlet, wherein the de-entrainment device comprises a first or downstream chamber, a second or upstream chamber separated from the downstream chamber by at least one permeable wall which is inclined with respect to the horizontal and which comprises coalescence means, and flow controlling means restricting fluid flow through the upper part of the coalescence means.

A BRIEF DESCRIPTION OF THE DRAWINGS

The invention will now be described by way of example in more detail with reference to the drawings, wherein.

DETAILED DESCRIPTION OF THE PREFERRED EMBODIMENT

Figure 1:
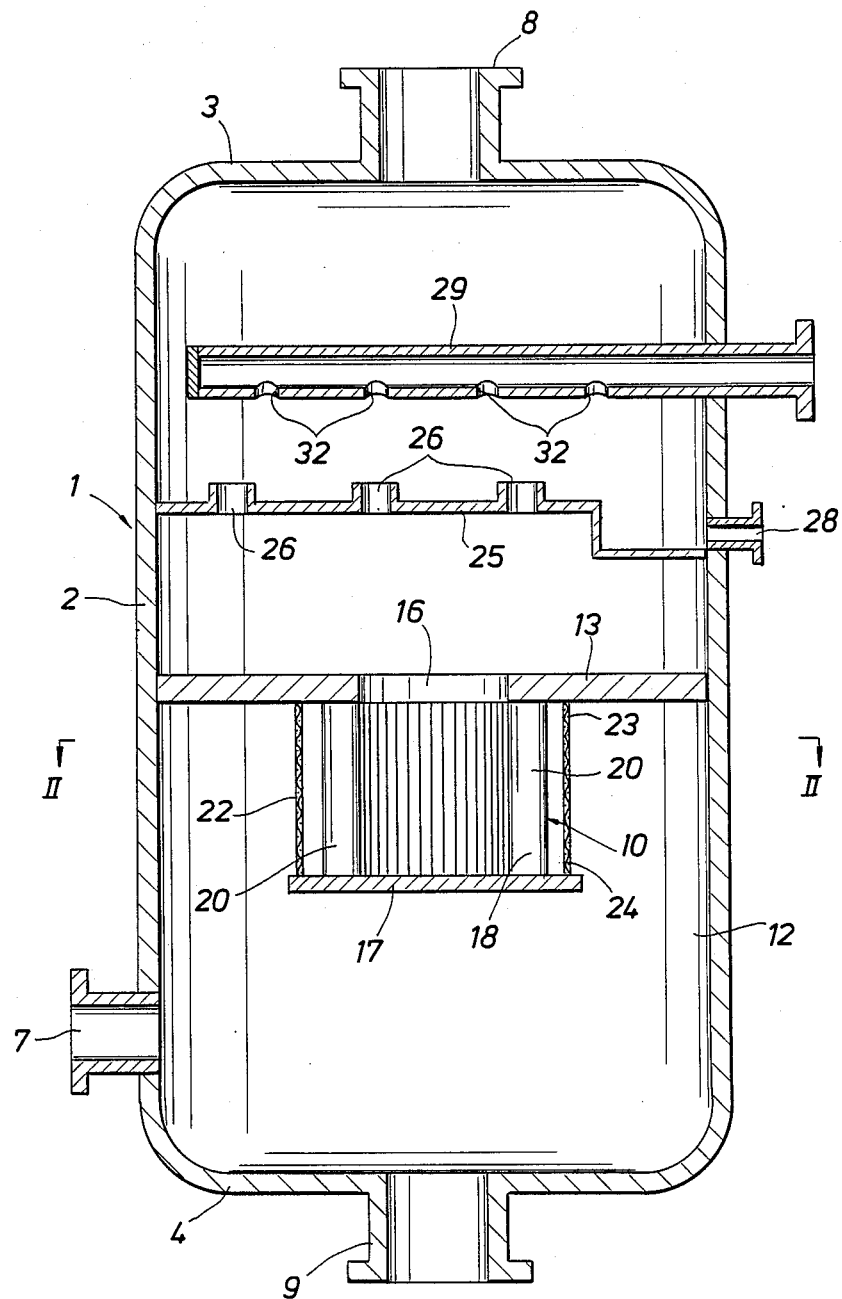
FIG. 1 is a longitudinal sectional view of a vertical distillation column according to the invention.
Figure 2:
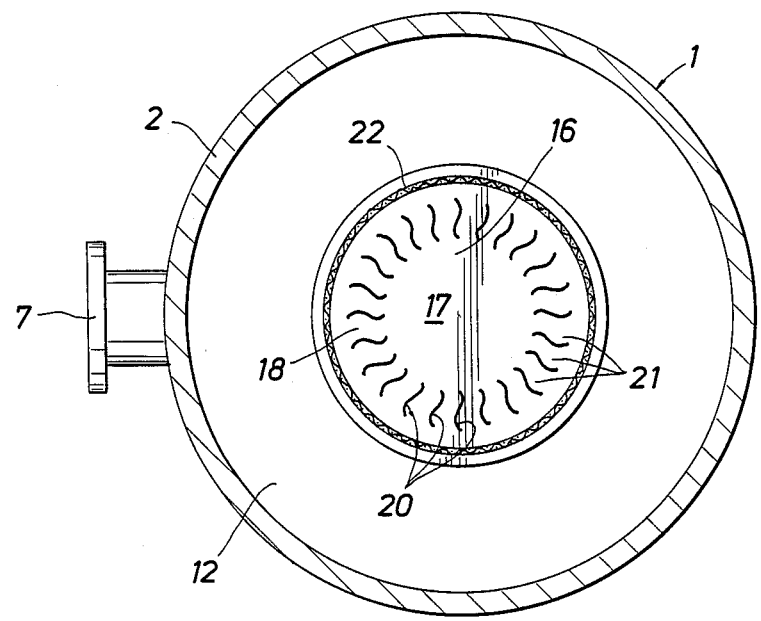
FIG. 2 is a cross-sectional view of the vertical distillation column taken along line II—II.

Reference is made to FIGS. 1 and 2 in which a vertical distillation column 1 has a cylindrical wall 2, a top cover 3, a bottom cover 4, a feed inlet 7 arranged in the lower part of the column 1, a gas outlet 8 arranged in the upper part of the column 1 and a liquid outlet 9 arranged in the bottom part of the column 1 below the feed inlet 7.

In the vertical distillation column 1, between the feed inlet 7 and the gas outlet 8, there is arranged a de-entrainment device 10.

The de-entrainment device 10 comprises an annular downstream chamber 12 closed at its upper end by plate 13, an upstream chamber 16 closed at its lower end by plate 17, and a permeable wall 18 separating the downstream chamber 12 and the upstream chamber 16.

The permeable wall 18 comprises coalescence means in the form of adjacent corrugated plates 20 with zigzag channels 21 between adjacent corrugated plates 20. The waves of the corrugated plates 20 extend in horizontal direction. For the sake of clarity in FIG. 2, not all corrugated plates and not all zigzag channels have been indicated with reference numerals.

To distribute, during normal operation, fluid passing through the coalescence material evenly over the area of the coalescence means perpendicular to the direction of flow without significantly increasing the pressure drop across the de-entrainment device 10, the de-entrainment device 10 further comprises flow controlling means restricting fluid flow through the upper part of coalescence means in the form of screen 22, which has small openings 23 at its upper part and larger openings 24 at its lower part.

The vertical distillation column 1 further comprises a treating device in the form of tray 25 provided with a plurality of rimmed openings 26, a discharge tube 28 and a spray tube 29 provided with a plurality of openings 32.

During normal operation, the gas outlet 8 is connected to a vacuum drive (not shown) to maintain the pressure between 100 Pa (absolute) and 10,000 Pa (absolute). Feed comprising a mixture of gas and liquid is introduced at a temperature between 300° C. and 500°

C. into the vertical distillation column 1 via feed inlet 7. A part of the liquid is dropped into the bottom part of the column 1 and discharged therefrom through liquid outlet 9. A mixture of gas and the remaining liquid passes upwards into the downstream chamber 12 pertaining to the de-entrainment device 10, and is forced by plate 13 to flow through the coalescence means.

Liquid impinging on the corrugated plates 20 pertaining to the coalescence means as the gas-liquid mixture passes through the zigzag channels 21 is collected on the corrugated plates 20 and flows as a film downwards along corrugated plates 20. The liquid is collected on plate 17 from where it flows into the bottom part of the vertical column 1 and it is discharged through the liquid outlet 9.

Gas substantially free of liquid enters the upstream chamber 16, and flows upwards to the treating or condensing device, where it flows through the rimmed openings 26. In order to condense part of the gas, liquid is sprayed out of the openings 32 of the spray tube 29, the liquid and condensate are collected on the tray 25 and drawn off through the discharge tube 28. A part of the drawn off liquid can be passed to the spray tube 29 to be sprayed into the gas flowing upwards through the rimmed openings 26.

The remaining gas is drawn off through the gas outlet 8.

Since liquid and gas enter co-currently the coalescence means pertaining to the de-entrainment device 10, liquid is efficiently removed from the gas. In addition, since liquid is collected on the corrugated plates 20 in a direction transverse to the direction of gas flowing through the zigzag channels 21, re-entrainment of liquid will only start at relatively high gas velocities. Moreover, if the amount of feed introduced into the vertical distillation column is increased to such a level that gas passing through the de-entrainment device will re-entrain liquid, the area of the de-entrainment device can be increased by increasing the length thereof which will not significantly increases the pressure drop across the de-entrainment device.

Figure 4:
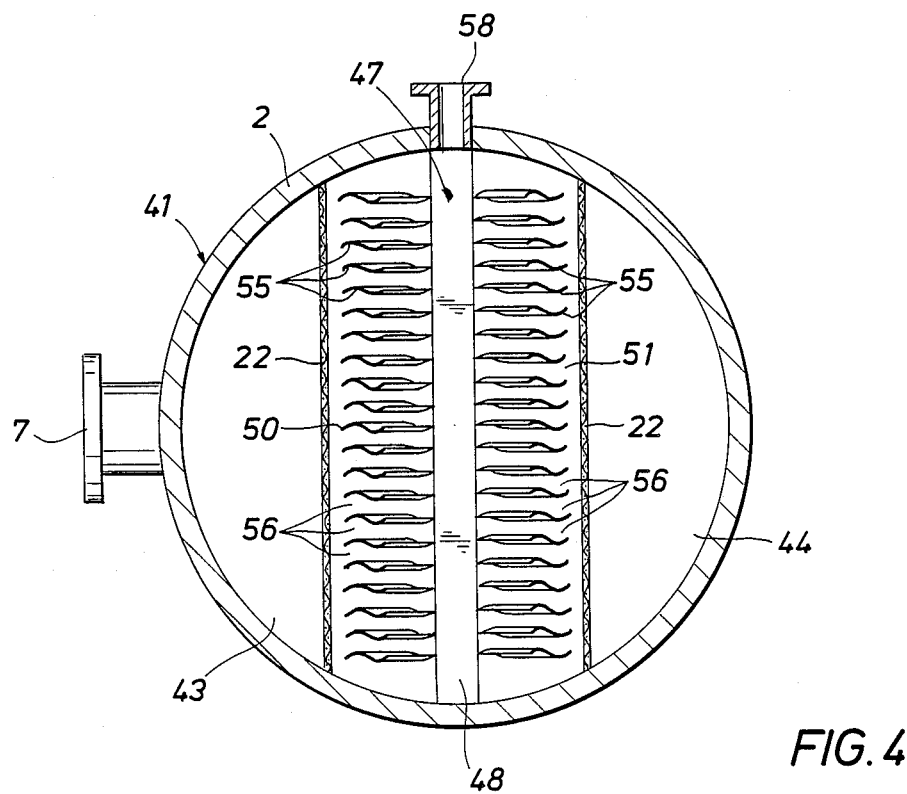
FIG. 4 is a cross-sectional view of the vertical distillation column of FIG. 3 taken along line IV—IV.
Figure 3:
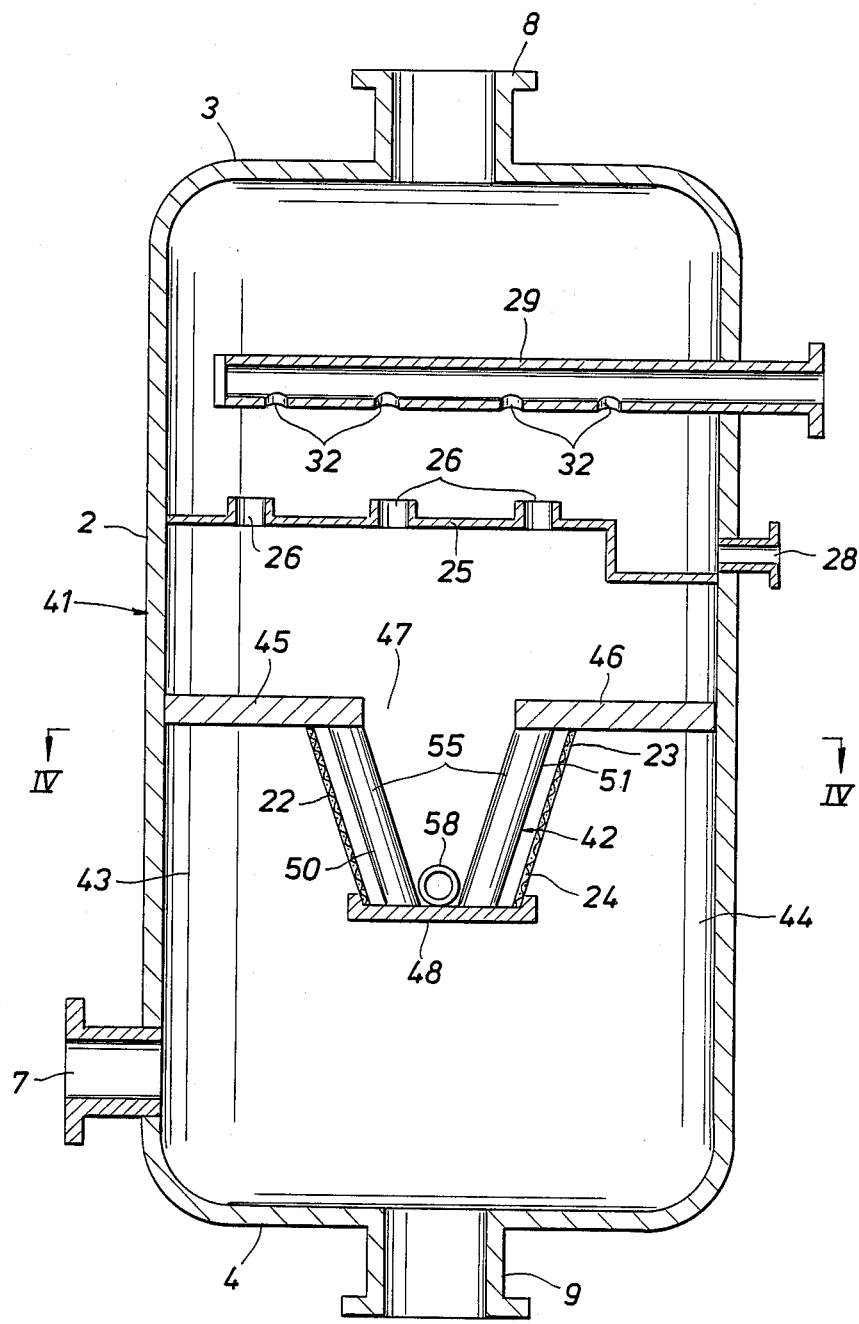
FIG. 3 is a longitudinal sectional view of another vertical distillation column according to the invention.

Reference is now made to FIGS. 3 and 4, showing an alternative vertical distillation column 41, wherein elements which correspond to elements shown in FIGS. 1 and 2 have identical reference numerals.

The vertical distillation column 41 is provided with a de-entrainment device 42 comprising two downstream chambers 43 and 44 closed at their upper ends by plates 45 and 46, and an upstream chamber 47 closed at its lower end by rimmed plate 48 and separated from the downstream chambers 43 and 44 by inclined permeable walls 50 and 51 extending across the vertical distillation column 41.

The inclined permeable walls 50 and 51 comprise coalescence means in the form of corrugated plates 55 with zigzag channels 56 between adjacent corrugated plates 55. The waves of the corrugated plates 55 extend in an inclined direction. The flow controlling means for restricting fluid flow through the coalescence means are provided, in the preferred embodiment, by screen 22 having small openings 23 at is upper part and larger holes 24 at its lower part.

The operation of the vertical distillation column 41 is substantially similar to the operation of the vertical distillation column 1 described with reference to FIG. 1 and 2. In addition, liquid collected on the rimmed plate 48 can be drawn-off through outlet 58.

The de-entrainment device may comprise more than two inclined permeable walls separating the downstream chamber from the upstream chamber, for example, four arranged in a rectangle or square.

In the de-entrainment devices shown in FIGS. 1-4, the waves pertaining to adjacent corrugated plates extend in the same direction, in an alternative de-entrainment device (not shown) the waves pertaining to adjacent corrugated plates extend in different directions. In this case the corrugated plates can be so arranged that the crests of the waves of adjacent corrugated plates are in contact with each other.

The downstream chamber may be provided with spray nozzles to allow spraying of liquid on the flow controlling means and the coalescence means for cleaning these means.

In the lower part of the vertical distillation column between the feed inlet and the coalescence means there may be arranged a device for distributing the feed introduced into the column evenly over the cross-section of the column.

What is claimed is:

1. Vertical distillation column having a feed inlet arranged in the lower part of the column, a gas outlet arranged in the upper part of the column, and a de-entrainment device arranged in the column between the feed inlet and the gas outlet, wherein the de-entrainment device comprises a first chamber, a second chamber extending above the first chamber within the column and separated from the first chamber by at least one permeable wall which is inclined with respect to the horizontal plane and comprises coalescence means, and flow controlling means restricting fluid flow through the upper part of the coalescence means.

2. Vertical distillation column as claimed in claim 2, wherein the flow controlling means comprises a screen arranged along with one of the sides of the permeable wall.

3. Vertical distillation column as claimed in claim 1, wherein the first chamber is closed at its upper end and the second chamber is closed at its lower end.

4. Vertical distillation column as claimed in claim 1, wherein the permeable wall are arranged vertically.

5. Vertical distillation column as claimed in claim 1, wherein the coalescence means comprises a plurality of zigzag channels.

6. Vertical distillation column as claimed in claim 5, wherein the zigzag channels are defined between a plurality of adjacent corrugated plates.

7. Vertical distillation column as claimed in claim 6, wherein the zigzag channels of the corrugated plates extend horizontally.

8. Vertical distillation column as claimed in claim 7, wherein the plates are arranged vertically.

9. A vertical distillation column comprising:
a housing having an upper and lower part, said housing comprising a cylindrical wall;
a feed inlet through the lower part of the housing;
a gas outlet through the upper part of the housing;
a liquid outlet through the lower part of the housing below the feed inlet; and
a de-entrainment device within the housing between the feed inlet and the gas outlet, said de-entrainment device comprising:
at least one permeable wall which is inclined with respect to the horizontal and which separates the interior of the housing into a first chamber and a second chamber extending above the first chamber within the housing;

coalescence means within the permeable wall comprising a plurality of zigzag channels; and flow controlling means restricting fluid flow through the upper part of the coalescence means comprising a screen adjacent the permeable wall having more restrictive fluid passageways in its upper portion than in its lower portion.

10. A vertical distillation column as claimed in claim 9, wherein each of the permeable walls is arranged vertically.

11. A vertical distillation column as claimed in claim 9, wherein the zigzag channels are defined between a plurality of adjacent corrugated plates having waves.

12. A vertical distillation column as claimed in claim 11, wherein the waves of the corrugated plates extend horizontally.

13. A vertical distillation column as claimed in claim 12, wherein the corrugated plates are arranged vertically.

* * * * *